(12) United States Patent
Hughes et al.

(10) Patent No.: US 11,795,998 B2
(45) Date of Patent: Oct. 24, 2023

(54) SYSTEM AND METHOD FOR RACE GEOMETRY AND PRESSURE SEAL FOR USE IN SPACE SUITS

(71) Applicants: Milo Hughes, Brooklyn, NY (US); Andrew Redd, Seattle, WA (US)

(72) Inventors: Milo Hughes, Brooklyn, NY (US); Andrew Redd, Seattle, WA (US)

( * ) Notice: Subject to any disclaimer, the term of this patent is extended or adjusted under 35 U.S.C. 154(b) by 373 days.

(21) Appl. No.: 17/342,663

(22) Filed: Jun. 9, 2021

(65) Prior Publication Data
US 2021/0381547 A1    Dec. 9, 2021

Related U.S. Application Data

(60) Provisional application No. 63/036,705, filed on Jun. 9, 2020.

(51) Int. Cl.
   *F16C 19/16*       (2006.01)
   *F16C 33/76*       (2006.01)
   *B64G 6/00*        (2006.01)

(52) U.S. Cl.
   CPC .............. *F16C 19/16* (2013.01); *B64G 6/00* (2013.01); *F16C 33/765* (2013.01)

(58) Field of Classification Search
   CPC .... F16C 17/163; F16C 17/166; F16C 33/765; F16J 15/43; B64G 6/00
   See application file for complete search history.

(56) References Cited

U.S. PATENT DOCUMENTS

| | | | |
|---|---|---|---|
| 4,596,054 A * | 6/1986 | MacKendrick | F16C 33/7853 277/362 |
| 4,817,964 A | 4/1989 | Black, Jr. | |
| 2009/0129713 A1 * | 5/2009 | Hattori | F16C 19/166 384/514 |
| 2017/0211704 A1 * | 7/2017 | De La Bruere Terreault | F16J 15/43 |
| 2018/0355911 A1 * | 12/2018 | Ohara | F16C 33/7846 |

FOREIGN PATENT DOCUMENTS

JP       H0771620 A  *  3/1995

OTHER PUBLICATIONS

Machine Translation of JP-H0771620-A (Year: 1995).*
Ochonski, "Dynamic Sealing with Magnetic Fluids", Wear, 130, pp. 261-268, 1989.
Evine, "Development of a Ferromagnetic Rotary Vacuum Sealed Spacecraft Spin Fixture", Paper No. 4, NASA. Goddard Space Flight Center Ninth Conf. on Space Simulation, Jan. 1, 1977.
Bearing Data, SKF, https://www.skf.com/us/products/rolling-bearings/ball-bearings/angular-contact-ball-bearings/four-point-contact-ball-bearings/bearing-data, Oct. 25, 2019.

(Continued)

*Primary Examiner* — Alan B Waits
(74) *Attorney, Agent, or Firm* — Meagher Emanuel Laks Goldberg & Liao, LLP

(57) ABSTRACT

According to various embodiments, a space suit joint is disclosed. The space suit joint includes a contact bearing having a plurality of contact points with an angular offset of a centerline in a radial direction and an angular offset from the centerline in an axial direction. The space suit joint further includes a ferrofluid pressure seal comprising an inner and outer race with a magnetic circuit embedded therein.

16 Claims, 20 Drawing Sheets

(56) References Cited

OTHER PUBLICATIONS

"Rolling Bearings", Motion and Control NSK, NSK Wen site, http://www.nsk.com, Mar. 2005.
"Magnetic Fluid Seal", EagleBurgmann, https://www.ekkeagle.com/en/wp-content/uploads/2014/09/EKK-Magnetic-fluid-seal-CAT-N004E-11122.pdf, Sep. 2014.
Rhodes et al., "Development and Wear Evaluation of Titanium Spacesuit Bearings", 46th International Conference on Environmental Systems, Jul. 10-14, 2016.
De Baca et al., "Failure Simulation Testing of the Z-1 Spacesuit Titanium Bearing Assemblies", 46th International Conference on Environmental Systems, Jul. 10-14, 2016.
Rhodes et al., "Development and Wear Evaluation of Titanium Spacesuit Bearings", 47th International Conference on Environmental Systems, Jul. 16-20, 2017.
Splawn et al., "Planetary Glove Advancements and Testing", 47th International Conference on Environmental Systems, Jul. 16-20, 2017.
Bartlett et al., "In-Situ Fabricated Space Suits for Extended Exploration and Settlement", 47th International Conference on Environmental Systems, Jul. 16-20, 2017.
Rhodes et al., "Design and Validation Testing of Titanium Spacesuit Bearings", 48th International Conference on Environmental Systems, Jul. 8-12, 2018.
Matuszewski, "New Designs of Centrifugal Magnetic Fluid Seals for Rotating Shafts in Marine Technology", Polish Maritime Research 2, (102), vol. 26, pp. 33-46, 2019.
"Safety Standard for Oxygen and Oxygen Systems: Guidelines for Oxygen System Design, Materials Selection, Operations, Storage, and Transportation", NASA National Aeronautics and Space Administration, Jan. 1996, https://ntrs.nasa.gov/citations/19960021046.
Ravaud et al., "Magnetic pressure and shape of ferrofluid seals in cylindrical structures", Journal of Applied Physics, 106, 2009.
Scherer et al., "Ferrofluids: properties and Applications", Brazilian Journal of Physics, vol. 35, No. 3A, pp. 718-727, Sep. 2005.
https://evolution.skf.com/four-point-contact-ball-bearings-two-in-one/, Jun. 25, 2015.

* cited by examiner

| AΘXβ | Inner Race Contact Points (degrees) | Inner Race Contact Points (degrees) |
|---|---|---|
| A15X30 | -45, 15 | -15, 45 |
| A15X35 | -50, 20 | -20, 50 |
| A25X30 | -55, 5 | -5, 55 |
| A25X35 | -60, 10 | -10, 60 |
| A30X30 | -60, 0 | 0, 60 |
| A30X35 | -60, 5 | -5, 60 |

| AθXβ Notation | Static Torque (Newton Meters) |
|---|---|
| A15X30 | 0.0590 |
| A15X35 | 0.106 |
| A25X30 | 0.0345 |
| A25X35 | 0.0950 |
| A30X30 | 0.0287 |
| A30X35 | 0.0678 |

*FIG. 12*

SYSTEM AND METHOD FOR RACE GEOMETRY AND PRESSURE SEAL FOR USE IN SPACE SUITS

CROSS-REFERENCE TO RELATED APPLICATIONS

This application claims priority to provisional application 63/036,705, filed Jun. 9, 2020, which is herein incorporated by reference in its entirety.

FIELD OF THE INVENTION

The present invention relates generally to space suit development and optimization and, more particularly, to a system and method for space suit ball bearing ferrofluid pressure seals and hybrid A/X type race geometry.

BACKGROUND OF THE INVENTION

The development of ball bearings for use in extravehicular activity (EVA) spacesuits contends with issues related to hermetic sealing, friction losses, race wear, and axial and radial loading over long life cycles. These issues are exacerbated for larger bearings where friction forces impeding rotation are necessarily greater. Human testing conducted by Final Frontier Design revealed that in prototype shoulder bearings with two axis normal contact points, or C type contact points, and in using a Teflon pressure seal, rotations were difficult. These negative effects were not overwhelmingly restrictive for wrist and elbow bearings, but their presence indicates that with extended use and increased race wear that these effects could begin to impact wrist and elbow bearings.

In recent years, an emphasis has been placed on the study of titanium bearings to mitigate these effects, but as titanium is highly flammable, its presence in oxygen rich environments is not desirable. Furthermore, titanium is expensive as a raw material and difficult to be machined, and it has poor tribological and wear performance. Bearings and rotary shafts in other industries have long mitigated these issues by the introduction of new systems and different geometries as opposed to changing materials. Applying and optimizing these configurations for bearings used in spacesuits has not been the focus of many research studies.

As such, there is a need for an optimized space suit configuration that introduces new materials as well as geometries.

SUMMARY OF THE INVENTION

According to various embodiments, a space suit joint is disclosed. The space suit joint includes a contact bearing having a plurality of contact points with an angular offset of a centerline in a radial direction and an angular offset from the centerline in an axial direction. The space suit joint further includes a ferrofluid pressure seal comprising an inner and outer race with a magnetic circuit embedded therein.

According to various embodiments, a space suit joint is disclosed. The space suit joint includes a contact bearing having a plurality of contact points with an angular offset of a centerline in a radial direction and an angular offset from the centerline in an axial direction.

According to various embodiments, a space suit joint is disclosed. The space suit joint includes a ferrofluid pressure seal comprising an inner and outer race with a magnetic circuit embedded therein.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 12 depicts a table of static torque required to rotate bearings used for race testing according to an embodiment of the present invention;

DETAILED DESCRIPTION OF THE INVENTION

Figure 1A:
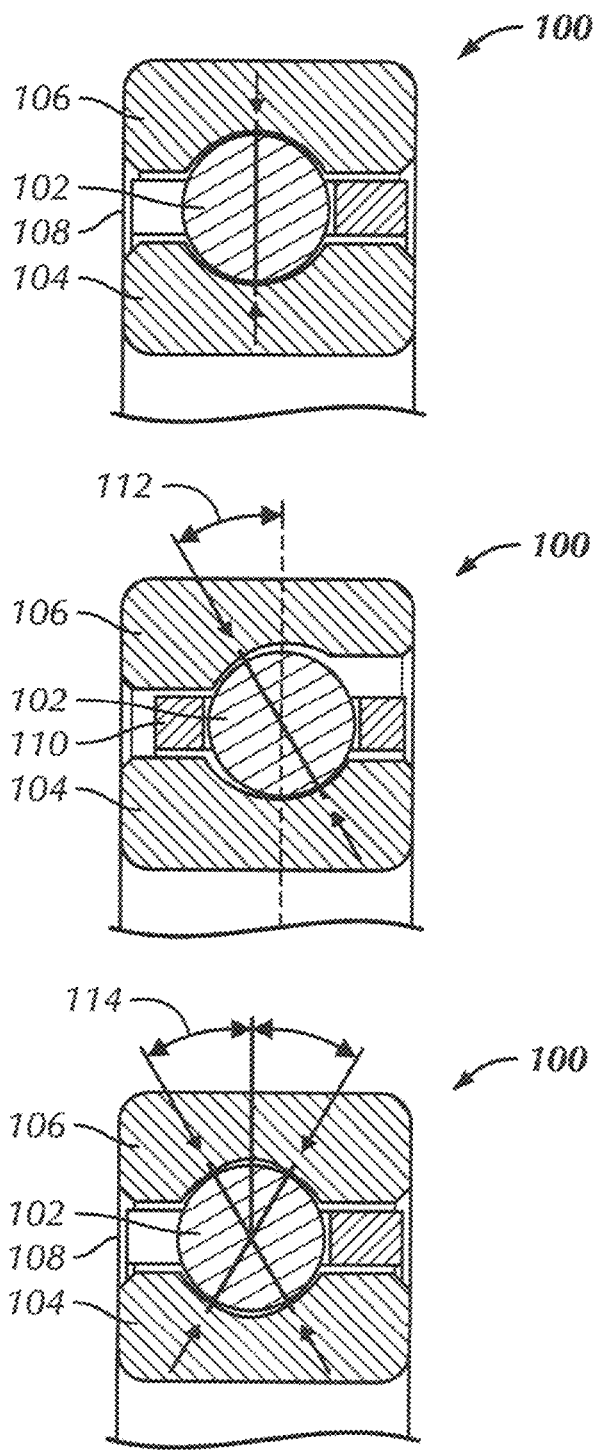
FIG. 1(a) depicts cross sectional views of C, A, and X contact angle bearings according to an embodiment of the present invention.

Ball bearings used by NASA, NPP Zvezda, and private aerospace corporations for space suits have not seen significant change since their inception. Plastic pressure and dust seals and two axis normal contact point configurations are historically prolific, although four contact point geometries are attracting increasing interest. Problematic larger diameter bearings, such as the ones planned to be included for the shoulder, waist, and hip bearings in xEMU and Z-2 space suits, will particularly benefit from race and pressure seal configuration improvements.

Generally disclosed herein are embodiments for race geometry and pressure seals for use in space suits. Four contact point geometries reduce race wear and friction over time and angled contact points improve performance in axial loading. Ferrofluid pressure seals have immeasurably low leakage, long lifetimes, and extremely low mechanical friction. They are extremely effective for sealing against typical dust particles and have high potential for sealing against small and ferromagnetic regolith particles. This improvement would eliminate the need for many separate dust sealing systems. Embodiments disclosed herein demonstrate the ability of these technologies to be implemented into existing EVA space suit configurations while adhering to NASA regulations. Embodiments disclosed herein also show the effectiveness of various disclosed race and pressure seal configurations.

Ferrofluid pressure seals have been used in some industries. They are most often used in vacuum rotary feed-throughs and exclusion seals, for example in vacuum furnaces used for heat treatment of metals and computer hard drives. A ferrofluidic pressure seal can provide numerous benefits, including dust sealing capabilities and immeasurably low leakage. Hermetic sealing can save up to 2 kg of oxygen during EVA. Furthermore, shaft eccentricities are allowable, and a fine surface finish is not required. Mere centimeters from the bearing, the magnetic field required for a ferrofluid seal is comparable to the strength of the magnetic field of the earth at sea level, so electromagnetic interference (EMI) is an unfounded concern. It is an extremely promising technology ready to be adapted to space suit applications.

Four contact point and angled contact point configurations are also used and mass produced from commercial bearing manufacturers. Angled two contact point bearings, or A type bearings, better accommodate radial loading due to the radial play allowed but have little resistance to axial forces in one direction. Alternatively, they are used in sets of two races containing balls whereby the increased unidirectional thrust capacity is complemented with another set of balls in a race with contact points normal to the first race, thus allowing forces in both axial directions to be accommodated with almost no radial or axial play. Four contact point bearings with angles offset from the radial and ball bisecting plane, or X type bearings, have comparatively lower friction and race wear over long life cycles when compared with traditional two contact point bearings due to differences in the buildup of surface roughness at the point of contact. The same radial force is applied across more contact points, distributing the force that leads to degradation of the surface finish in the races. This can result in significant gains in performance over long periods of time and offsets the increase in friction from the initial increase in surface area in an uncycled bearing. They are also able to successfully resist radial, axial, and moment loads without requiring a second race.

The bearings disclosed herein utilize both an angular offset of the centerline as in A type bearings and four contact points offset from this centerline, as in X type bearings. This will allow a greater thrust capacity in axial and radial loading while simultaneously reducing race wear over a life cycle. However, without careful configuration in adherence with NASA regulations, these geometries can be difficult to machine in a lathe. This is especially true of the outer race which has an inward facing groove. The extreme precision of the races and the required surface finish can be difficult to accomplish while also keeping all faces tangent and without having small overhangs that make lathing almost impossible. Specialized tooling is required to manufacture the races. However, doing so allows for the creation of a single race that performs well over long life cycles and with axial loading of large diameter bearings without the need for exploration of new, hazardous materials like titanium.

Race Geometry

While most spacesuit bearings use C type bearings, this can cause issues under radial and axial loading regimes due to the little radial play and a lack of contact points angled relative to axis normal, respectively. A type bearings can represent an improvement with increased thrust capacity, but with only two contact points there is only uniaxial load resistance. X type bearings are a good all round contact point configuration due to their propensity to resist moment, radial, and axial loads and the addition of contact points leads to the same force being distributed over a greater area, and thus reducing race wear over time. This can prolong the life of the bearings and decrease the friction due to rotation at the end of the bearing life cycle. FIG. 1(a) depicts cross sectional views of C, A, and X contact angle bearings.

Central bearing rotation axis is horizontal to the page. C has two contact points from bearing central axis normal, A has two contact points offset from this, and X has four total contact points.

A rotary bearing 100 includes a ring of balls 102 that facilitate rotation between an inner race 104 and an outer race 106. The inner and outer races 104, 106 will contact the balls 102 in different locations depending on the applications and loads. Bearings 100 do not function well if load carrying balls are in contact with one another, so various methods of separating them are employed. These include but are not limited to separator rings, separator springs, separator strips, spacer balls, and spacer slugs. FIG. 1(a) illustrates a snap-over separator 108 and a circular pocket separate 110. Bearings 100 in space suits require sealing against exposure to vacuum, extraterrestrial environments, and human particulates. Sealing is typically accomplished through plastic and mechanical seals such as labyrinth seals which limit leakage by creating a tortuous exit path and synthetic rubber knife-edge seals.

Figure 1B:
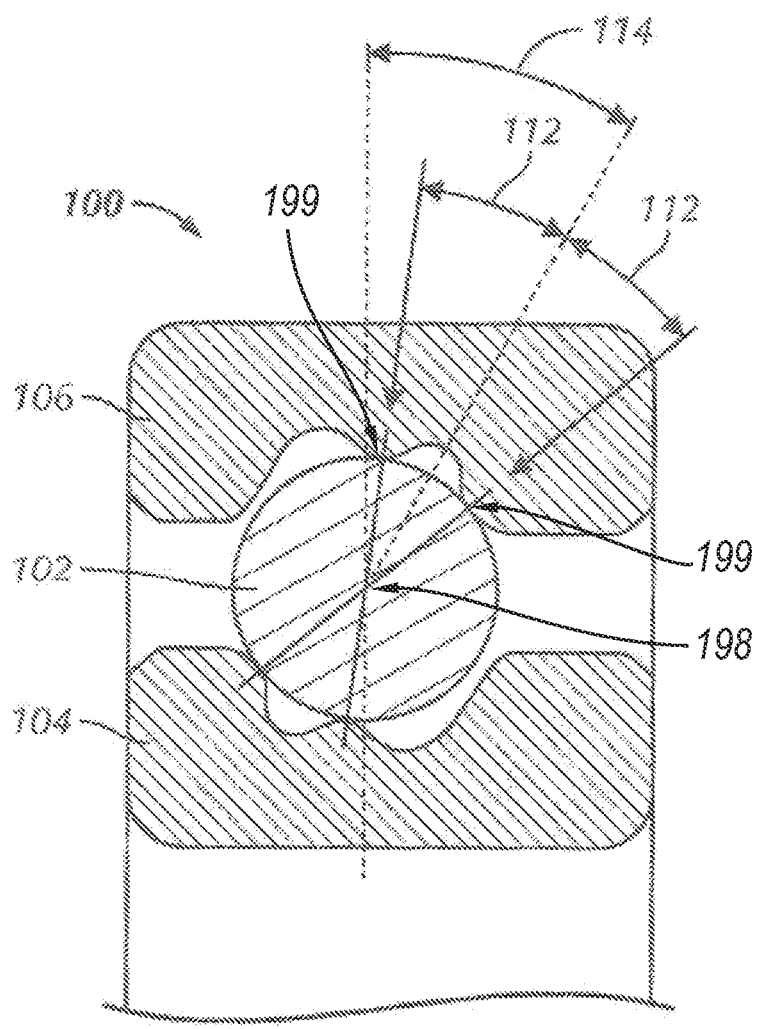
FIG. 1(b) depicts a cross sectional view of an A/X contact angle bearing according to an embodiment of the present invention.
Figures 2, 3:
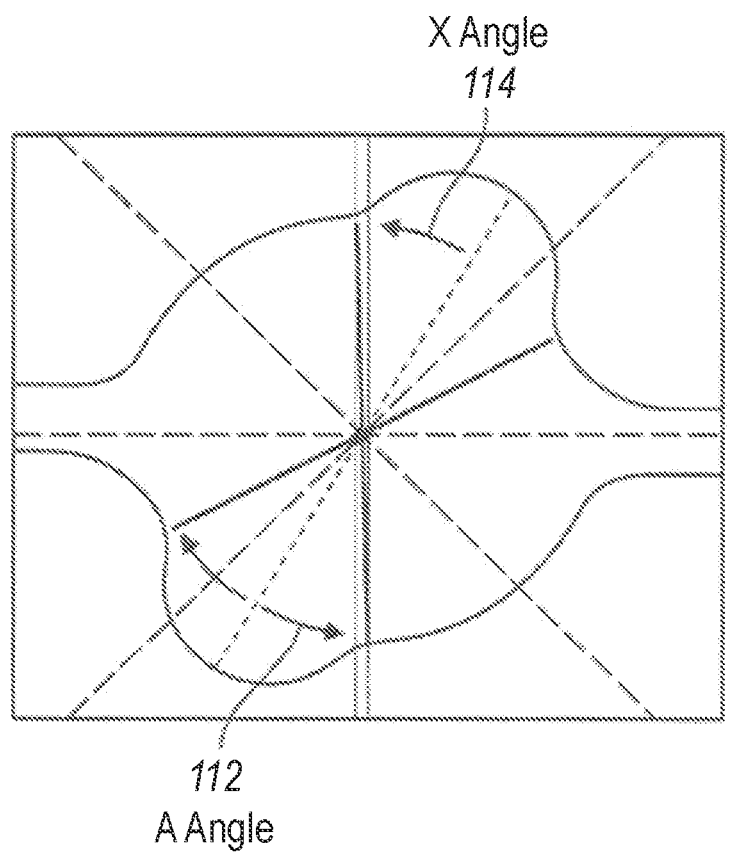
FIG. 2 depicts a table of tested angle of contact point according to an embodiment of the present invention.
FIG. 3 depicts an example of A and X type angles as used in race geometries according to an embodiment of the present invention.

For an exemplary set of bearings 100 disclosed herein, a combination of A type 112 and X type 114 bearings is used, as illustrated in FIG. 1(b). This results in large and effective thrust capacity relative to standard C type bearings without the need for an extra race, which increases the difficulty in configuring. It distributes radial and axial loads over a greater surface area, thereby decreasing surface roughness and therefore friction over cycles, as in an X type 114 bearing. The contact angles formed by the position of the plurality of contact points 199 of these bearings where each ball 102 contacts an inner or outer race 104, 106, relative to a center point 198, are denoted as AθXβ, whereby θ represents the angular offset of the centerline from the radial direction and β represents the angular offset from this centerline. Typical X angles 114 from mass manufacturers of bearings are between 30 and 45 degrees, with particular examples at 30, 35, and 45 degrees, while typical A angles 112 are between 15 and 40 degrees, with particular examples, at 15, 25, 30, and 40 degrees. Besides the differences in race geometry and resulting minor differences in channel radius relative to the central axis due to this, which is on the scale of a 0.1 mm difference radially, exemplary disclosed bearings have identical geometries and surface finishes. The surface finish in the race is average surface roughness Ra #4 or 4 μm, while the surface finish everywhere else is Ra #8 or 8 μm. Additionally, all bearings are constructed out of aluminum 6061. So, the contact angles are the only variable being evaluated. Exemplary contact angles disclosed herein, in AθXβ nomenclature as well as offset from the radial and ball bisecting plane are described in the table in FIG. 2 and an example of A angles 112 and X angles 114 as used generally in race geometries is depicted in FIG. 3.

Figure 4:
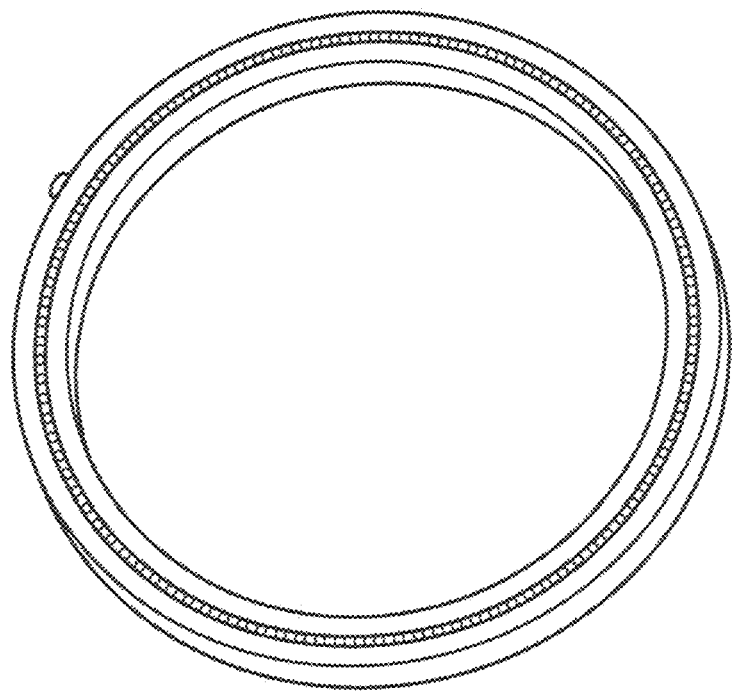
FIG. 4 depicts an assembled bearing used for race testing according to an embodiment of the present invention.

The disclosed exemplary set of bearings have an outer diameter of 140 mm, an inner diameter of 117 mm, and a height of 12.5 mm. This approximates the size of an elbow bearing without critical features in a fully implementable suite of bearings like thread holes and a buckle for securing an elastic band used to flex the arm. This size is slightly smaller than a typical elbow bearing and is smaller than the larger diameter waist, shoulder, and hip bearings in which friction concerns are most pressing and this race geometry is perhaps best suited for, but friction losses should scale with size. So, decreases in required torque to rotate and surface roughness in the testing bearings should also represent decreases in larger diameter bearings. 3.5 mm balls have been chosen to contact the races, with 3 mm balls used to space balls in contact with the races, which is a plausible size for an elbow bearing. Balls were inserted via a hole in the outer race which was plugged with an SLA 3D printed part that had a profile that is continuous with the outer race profile. Formlabs' Grey Pro resin was used for its high accuracy and low creep. It was printed in 50 μm layers and cured for 15 minutes. Ball diameter may impact torque or race wear with respect to life cycles but are not control variables here. The life cycle of these bearings is assumed to be 10,000 oscillations clockwise and counterclockwise of 180 degrees. 180 degrees was selected as approximately the limit of rotation as determined by the kinesiology of the wrist, shoulder, and arm. The 10,000 oscillations occur in intervals of 2,000 with torque measurements taken from a custom manufactured pulley before any oscillations and every interval thereafter. As the test bearings are not pressurized, an Instron is used to apply an equivalent tensile force that would occur due to the pressure differential between the suit and outer space environments. FIG. 4 depicts an assembled bearing used for race testing.

The race geometries are evaluated on two primary metrics: torque as a function of number of cycles and surface roughness at the end of the life cycle. Surface roughness can be measured using a scanning confocal microscope at each of the four contact points. While required torque and surface roughness should be related, with increased surface roughness leading to an increase in friction, it is possible that some geometries have inherently more friction than others with the same surface roughness. This would not be due to a difference in contact surface area, but rather due to a difference in how the different contact points interact with the same applied rotational force. The first primary metric is how much torque it takes to rotate the bearing, as this directly impacts the performance while in operation, with secondary emphasis placed on how the surface degrades over time. As there are multiple contact points, there is not one surface roughness measurement that fully defines the race. An increase in surface roughness that is distributed more evenly is preferable, as a critical point of high friction will be reached later and surface wear on the ball will be reduced.

Ferrofluid Pressure Seal

Current EVA spacesuit rotary bearing pressure seal designs rely on a knife edge contact of a low friction plastic such as Teflon or PEEK. Wear is compensated for by the orientation of the seal causing pressure to bend the seal, maintaining contact with the opposing wall. However, wear is never uniform enough for this methodology to be effective. Leakage from a plastic seal is anticipated and will increase with usage especially when radial loads and eccentric shaft motion are introduced. Traditional plastic pressure seals require a separate dust seal assembly to ensure that dust primarily in the form of skin cells and hair does not increase race friction and race wear over time. Protecting from regolith is the most extreme dust seal design goal. Ferromagnetic fluid pressure seal systems are used in aerospace and general applications, primarily as computer disk drives and high rpm industrial rotaries. NASA has also used ferrofluid pressure seals in thermal testing of spin stabilized satellites. Ferromagnetic pressure seals can be described as having zero-leakage, zero-wear, minimum friction drag characteristics, and high reliability potential. A ferrofluid pressure seal modified for a spacesuit rotary bearing would have at least the following advantages: (1) hermetic sealing; (2) immeasurably low leakage; (3) low friction; (4) dust sealing; (5) long life; (6) high reliability; (7) fine surface finish not necessary; (8) accommodates eccentric shaft motion; and (8) tolerant to space environment.

FIGS. 5(a)-(e) depicts a schematic diagram of a scye bearing assembly according to an embodiment of the present invention. The assembly includes an inner race bottom ring, which is the main load carrying component of the inner race that houses the dust seal, balls, and ferrofluid pressure seal. The assembly further includes a dust seal, such as a Nomex dust seal, which is a ring made from a non-flammable fabric that blocks regolith and human particulates from entering the groove containing the balls. The assembly also includes an outer race bottom ring, which is the main load carrying component of the outer race that houses the dust seal, balls, and ferrofluid pressure seal. The inner race bottom ring and outer race bottom ring are both made of aluminum, as a nonlimiting example. The assembly further includes 4 mm diameter balls, which are the load carrying balls that come into contact with the races and are made of a stiff metal or ceramic.

The assembly includes a pressure seal teeth gasket, which is a gasket used to seal the volume in between the teeth and the race which is not sealed by the ferrofluid on the bottom of the inner race. This gasket is made of compressible plastic. The assembly further includes an outer race pressure seal ring, which is the element of the ferrofluid pressure seal that completes the magnetic circuit that allows for the suspension for ferrofluid. This element is made of a ferrous metal. The assembly further includes an inner race pressure seal teeth ring, which is the element of the ferrofluid pressure seal that comes near the outer race pressure seal ring and allows for suspension of the ferrofluid. This element is also made of a ferrous metal. The assembly also includes a pressure seal magnet which produces the magnetic field for the circuit that suspends the ferrofluid and is made of neodymium.

The assembly includes an inner race pressure seal gasket, which is a gasket used to seal the volume in between the teeth and the race which is not sealed by the ferrofluid on the top of the inner race, and an outer race pressure seal gasket, which is a gasket used to seal the volume in between the outer race pressure seal ring and the top of the outer race. Both of these elements are made of a compressible plastic. The assembly further includes an outer race top ring, which is a metal piece fastened to and used to complete the outer race by compressing the outer race pressure seal gasket, and an inner race top ring, which is a metal piece fastened to and used to complete the inner race by compressing the inner race pressure seal gasket. Both of these elements can be made of aluminum. The assembly also includes a 3.5 mm diameter ball, which is used to hold the main load bearing 4 mm balls in tension. This ball is made of a stiff metal or ceramic. Other ball separator devices can be used in alternative embodiments.

Figure 5A:
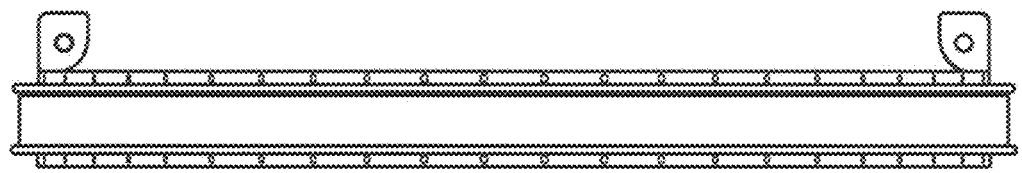
FIG. 5(a) depicts a view of a schematic diagram of a scye bearing pressure seal according to an embodiment of the present invention.
Figure 5B:
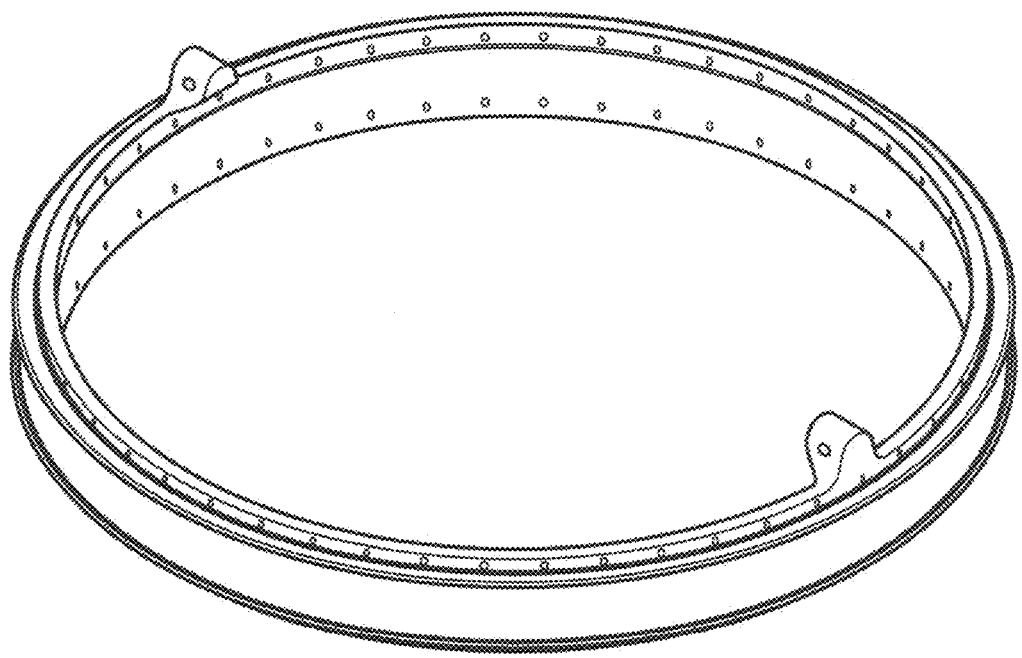
FIG. 5(b) depicts another view of a schematic diagram of a scye bearing pressure seal according to an embodiment of the present invention.
Figure 5C:
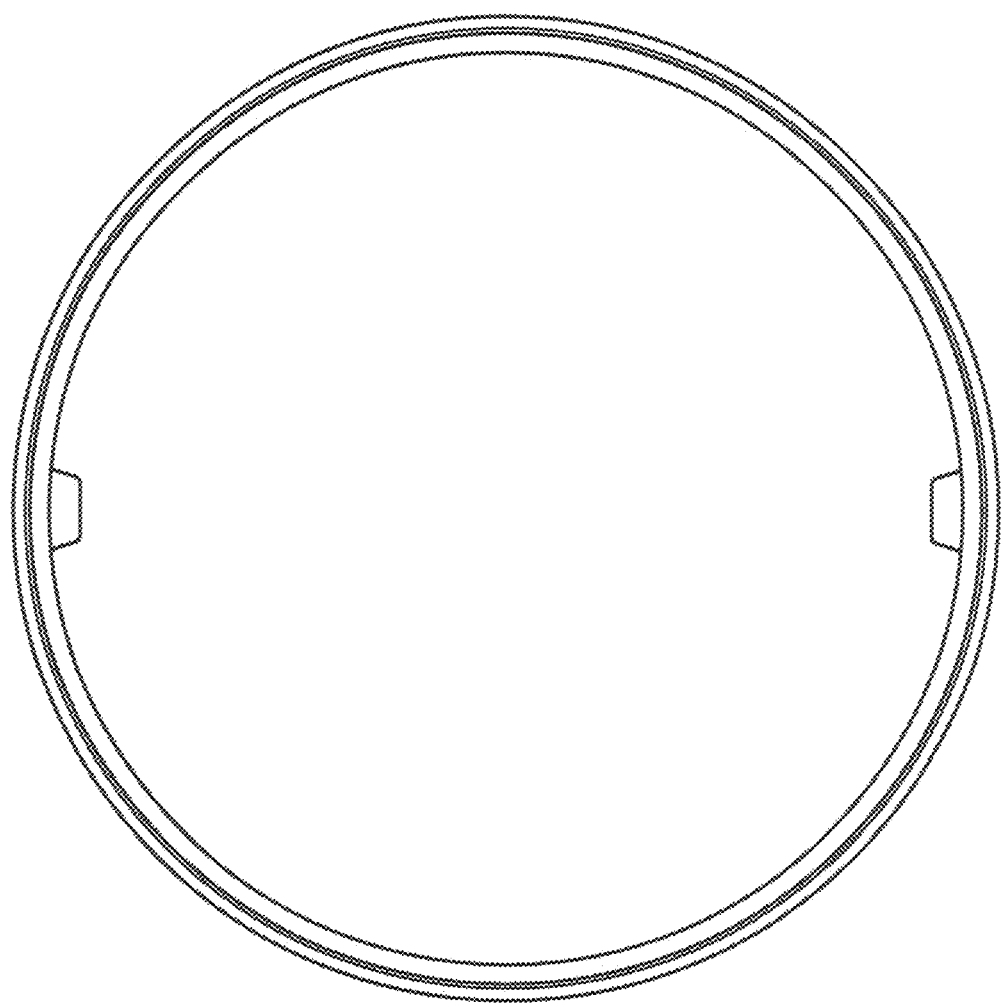
FIG. 5(c) depicts another view of a schematic diagram of a scye bearing pressure seal according to an embodiment of the present invention.
Figure 5D:
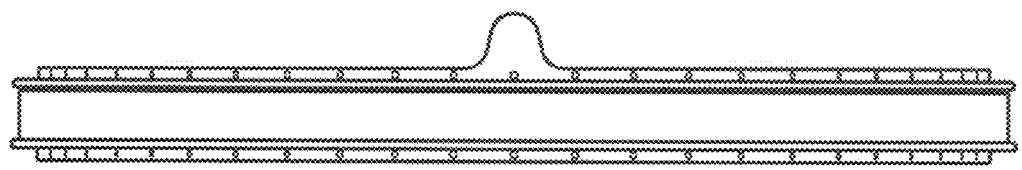
FIG. 5(d) depicts another view of a schematic diagram of a scye bearing pressure seal according to an embodiment of the present invention.
Figure 5E:
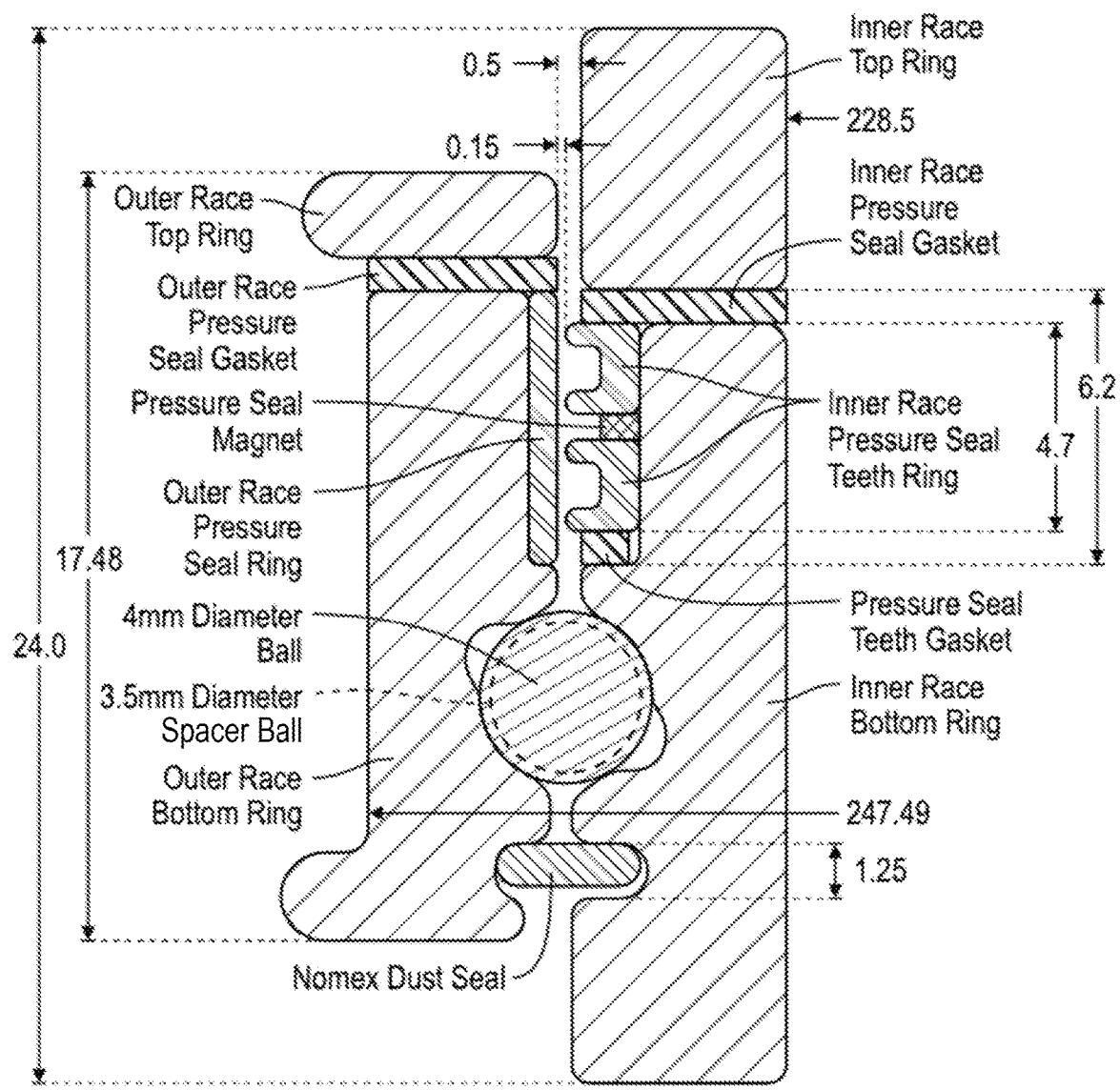
FIG. 5(e) depicts another view of a schematic diagram of a scye bearing pressure seal according to an embodiment of the present invention.
Figure 5F:
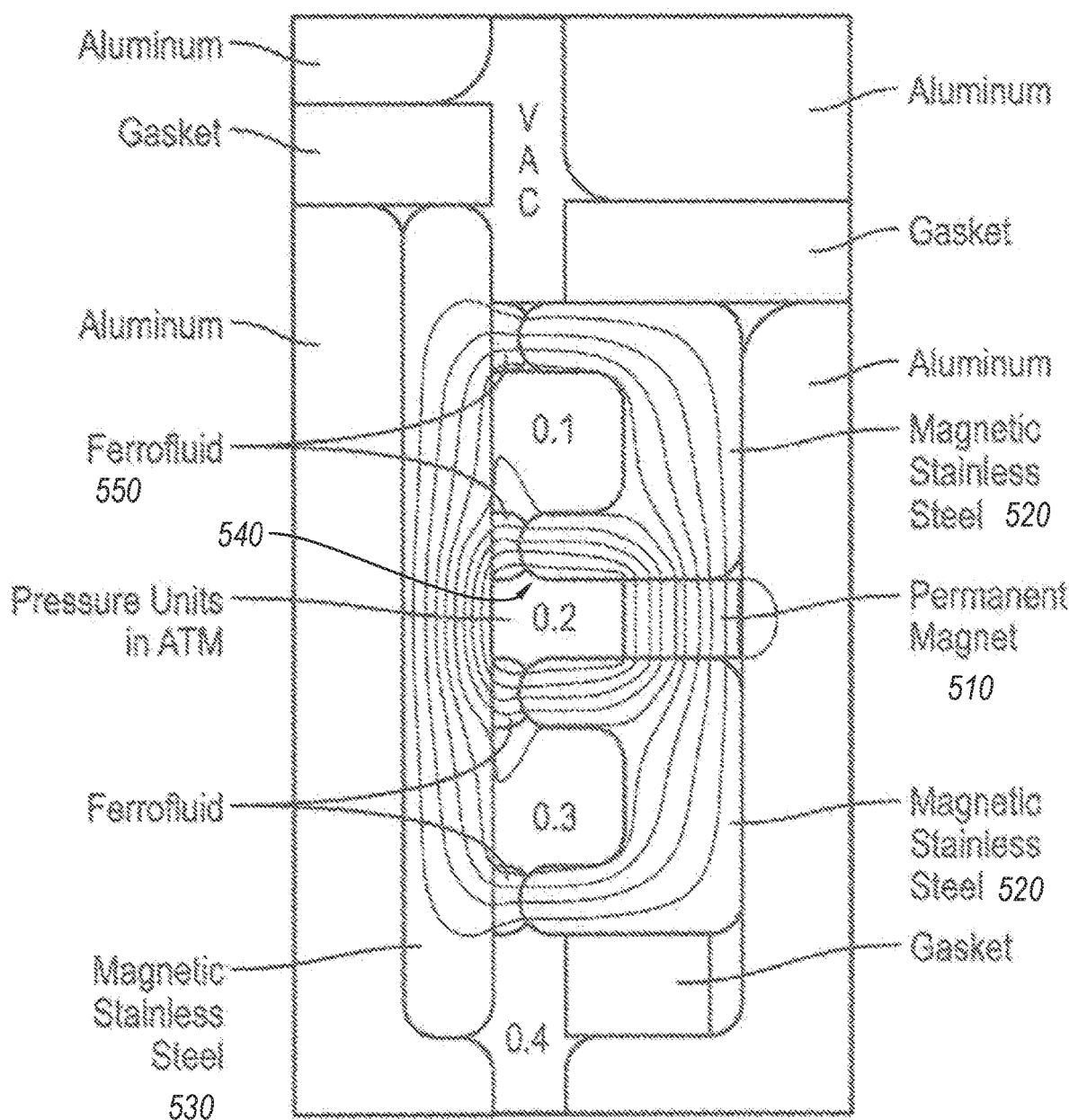
FIG. 5(f) depicts a diagram of ferrofluid location, magnetic circuit vector potential lines, and resultant pressure differentials according to an embodiment of the present invention.

A magnetic circuit made of neodymium and magnetic stainless steel is embedded into the inner and outer races such that a localized concentration of magnetic field causes the ferrofluid to settle naturally into an O-ring shape. Referring to FIGS. 5(e) and 5(f), a ring of permanent magnets 510, completed by magnetic stainless steel poles 520 and a magnetic stainless steel base 530, create a magnetic circuit that spans the gap between the inner and outer races. The magnetic field concentrates at the smallest radial clearance, where four steel teeth 540 protrude. This concentration of magnetic field strength holds the ferrofluid 550 in place creating a hermetic seal. The system is passive and does not require any power or electronics. The ferrofluid location, magnetic circuit vector potential lines, and resultant pressure differentials are depicted in FIG. 5(f).

A ferrofluid seal in space suit rotary bearings differ from large scale industrial feedthroughs and computer disc drives because of the additional environmental and operational requirements imposed by lunar missions, NASA, and the active human user. A ferrofluid space suit seal must be effective against dust, human particles, and extraterrestrial regolith, which is unique to the lunar environment. There can be no electromagnetic influence from the ferrofluid space suit seal on any surrounding electronics in the space suit, a NASA requirement of unique strictness compared to other applications. The ferrofluid space suit seal is physically limited to the outer circumference of the ball bearing to let limbs and the astronaut's head pass through. This requirement is atypical as most other applications have a full shaft passing through the ball bearing and are used to transfer torsional load as opposed to facilitating movement of limbs and a head.

The most important materials parameter is the magnetic permeability and the corrosion resistance of the housing material. To create an effective seal, it is adequate that the housing has a magnetic permeability considered significantly higher than the permeability of free space. Significant diminishing returns occur in the peak and average magnetic field strength when increasing the relative permeability over 500. An increase in magnetic permeability does not necessarily increase the effectiveness of the seal because the magnetic flux path of lowest energy remains the same. This conclusion was corroborated with simulations in Agros2d. Materials like nu-metal and iron have extremely high relative permeabilities but are not corrosion resistant in oxygen rich environments. Corrosion resistant coatings have prohibitively large thicknesses due to the low clearance between the stainless-steel base and the teeth.

Minimum thicknesses make all of the explored coatings unfeasible at minimum radial clearance. Ferritic and martensitic (400-grade) stainless-steels have relative permeabilities of approximately 750 and are corrosion resistant in space. While they present some machining challenges, such as the potential of hardening through heat treating while performing cuts, it is possible with low speeds to machine 400-grade stainless steel with both carbide and high-speed steel tools. 416 stainless steel is used because of its reliable magnetic permeability and the added sulfur content which aids in machinability. Considerations for the magnetic ring include flux capacity, corrosion resistance, and most importantly machinability. Uncoated neodymium magnets can be ground or sanded down to create custom shapes but will break due to brittleness when machining with any standard cutting tool.

As for magnetic properties, proxies between electrical circuits and magnetic circuits are used to explain the behavior of the ferrofluid seal magnetic circuit. Adhering to high permeability materials and the bridging of air gaps through small clearances are two behaviors of great importance. A proxy to Ohm's law, the magnetomotive force is representative of the reluctance that a magnetic charge would gain by completing a closed loop. Magnetomotive force helps explain the activity of the ferrofluid seal through its definition within a passive magnetic circuit system:

$$F = \Phi R; R = \frac{l}{\mu A} \tag{1}$$

Where Φ is the magnetic flux of the circuit, determined by the material properties of the magnet, R is the magnetic reluctance, determined by the area A, path length l, and average ferromagnetism μ of the circuit. The system will tend toward the lowest possible magnetomotive force, thus favoring magnetic circuits composed of higher relative permeability material and shorter path length. This explains the tendency of the circuit to pass through the ferrous housing and the tendency to pass between the inner and outer race at the smallest radial clearance. Finite element analysis was used to develop the magnetic circuit geometry and conduct material optimization.

In a non-homogeneous magnetic field, magnetic fluids are attracted toward maximum field intensity. This occurs because the magnetic moments are rotated parallel to the field in the minimum energy direction, then pulled in the direction of the field gradient. This phenomenon ensures that the fluid gathers at the highest field intensity area, which is the smallest radial clearance, producing an effective seal.

Figure 6A:
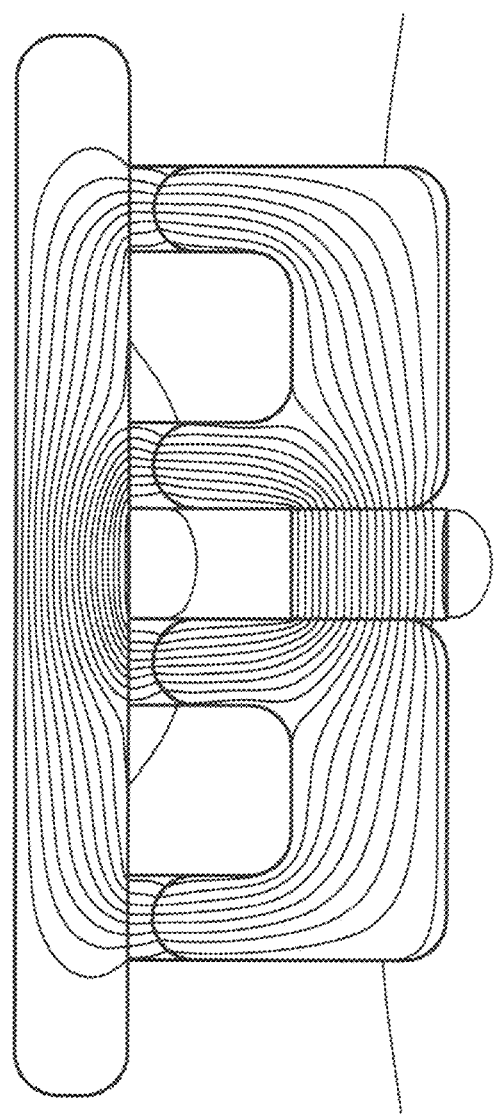
FIG. 6(a) depicts scye bearing pressure seal vector potential lines according to an embodiment of the present invention.
Figure 6B:
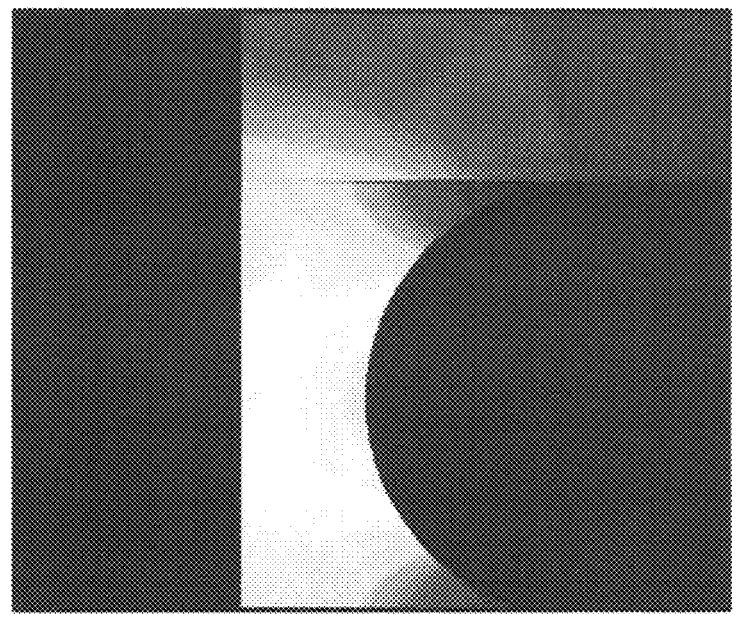
FIG. 6(b) depicts seal magnetic field strength with ferrofluid on linear scale according to an embodiment of the present invention.

Magnetic analysis was conducted in computer application Agros2D. Vector potential lines of the ferrofluid seal is shown in FIG. 6(a) to visualize the closed magnetic circuit, and a detailed view of a tooth with magnetic field strength on a linear scale is shown in FIG. 6(b). Geometry optimization was conducted in Agros2D with a focus on maximizing the magnetic intensity in the smallest radial clearance, while minimizing weight and allowing for repeatable and high accuracy machining. The flux steepness around the tooth location is maximized such that there is a high flux differential between the teeth and chamber.

Figure 6C:
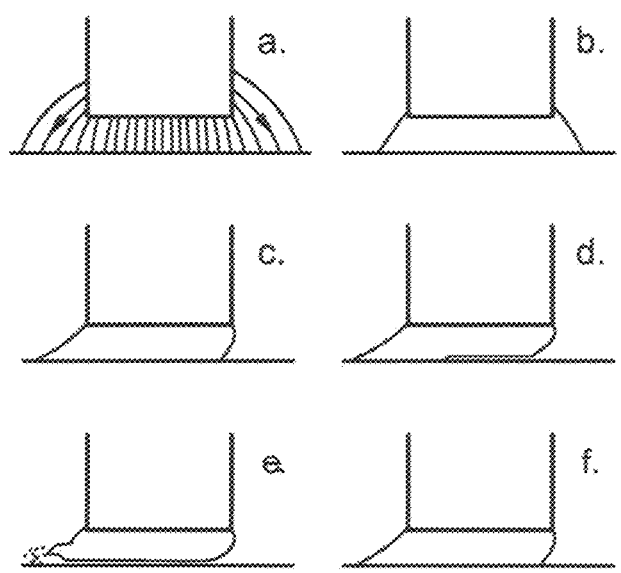
FIG. 6(c) depicts the process for achieving stable pressure differential according to an embodiment of the present invention.
Figure 6D:
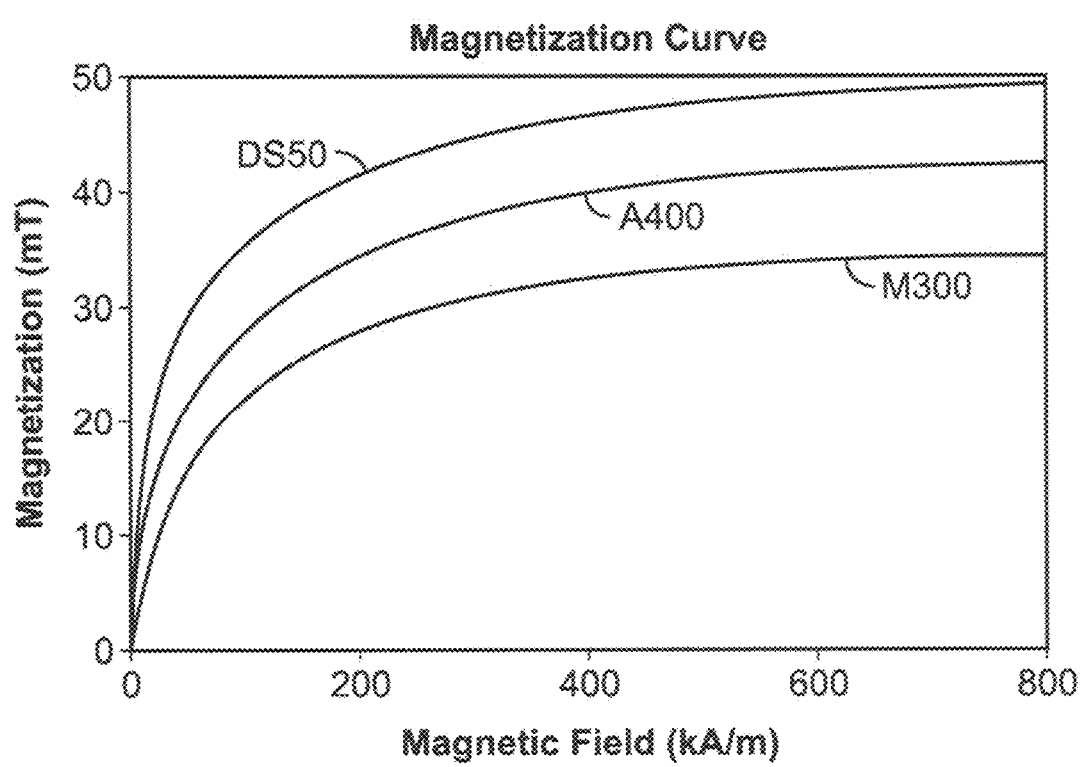
FIG. 6(d) depicts a magnetization curve showing the relationship between magnetic field intensity and the intensity of magnetization of a material according to an embodiment of the present invention.

Maintaining maximum flux differentials constrains the maximum strength and size of the magnet. Radial clearance is minimized while maintaining machinability and accommodating for eccentric motion, and a round, convex tooth is chosen to adhere to NASA rules and regulations (though that decision here is not intended to be limiting). Each stage of ferrofluid supports a pressure differential defined as:

$$p_m = \frac{2\mu_0 M H w}{\delta} \quad (2)$$

where M is the magnetization intensity of the fluid, H is the magnetic field strength, w is the tooth width, $\mu_0$ is the permeability of free space, and δ is the clearance distance. The total sealing capabilities of the seal assembly is the summation of the maximum pressure differentials of each stage. During the pressurization process, which must be gradually conducted so as not to violently burst the seal, each stage deforms then opens a pinhole allowing air to pass through, slowly achieving the optimal pressure differential. This process repeats until every stage reaches a stable pressure differential. This phenomenon is illustrated in FIG. 6(c). Part a. shows magnetic force lines coming off of the iron tooth, part b. shows the optimal ferrofluid settled shape, part c. shows the force differential malforms ferrofluid shape, part d. shows the pressure hole begins forming, part e. shows the ferrofluid bursts, and part f. shows the seal reforms. The base liquid of the ferrofluid seal must be inert and stable. One seal will be exposed to space, so it must have an extremely low vapor pressure to prevent off-gassing. A perfluoropolyether (PFPE) based ferrofluid can have a vapor pressure below $10^{14}$ Pa, below the pressure of space, effectively preventing evaporation. Ferrofluid seals have an extensive record of resistance to ultra-high vacuum conditions. The magnetization curve as illustrated in FIG. 6(d) is a profile showing the relationship between magnetic field intensity, and the intensity of magnetization of a material. The curve is approximately linear until the material reaches magnetic saturation, and then flattens. Before magnetic saturation, the slope of the curve is the magnetic permeability of the material. This profile is a parameter which can be adjusted during production. Other seals in the fixture can use a base liquid which maximizes magnetic saturation to get the most functionality out of the seal assembly.

Little information is available on the theoretical background of the dust sealing capability of ferrofluids, though it appears that surface tension is the dominate characteristic, particularly regarding wetting and capillary action. Ferrofluid has relatively low surface tension, about $$25 \frac{dyn_3}{cm}.$$

This is similar to the surface tension of alcohol. The problem of a solid particle breaching a liquid interface is tractable if the following assumptions are made: (1) the surface is perfectly smooth and defect free; (2) the particle is spherical; (3) the particle size is between the capillary length and characteristic length scale of long range surface forces; (4) and deformations of the solid and liquid interface are ignored. Under these assumptions, the system will settle at an equilibrium contact angle consistent with Young's Law, and found by minimizing the free energy of the system. However, the lunar regolith interaction with fluid cannot be analyzed through equilibrium contact angles because regolith geometry is too far from spherical for results to be satisfactory. Additionally, the movement dynamics of the ferrofluid introduce additional hydrodynamic complexities. As opposed to modeling the colloidal particle and liquid interface through equilibrium contact angle, molecular dissipation may be better equipped to explain the long-time scales of low-rate equilibration. Herein, dust sealing analysis is based on the assumption that magnetic forces dominate.

The primary two operating environments for the bearing assembly are outside of the ISS and on the moon. Outside of the ISS, all dust would be in the form of human skin cells and hair, and would be adequately handled by the Nomex felt seal on the arm side of the bearing. On the moon, regolith dust would enter through the vacuum side of the bearing. Gravitational differences between the Earth, the moon, and the ISS will effect the force interactions between the ferrofluid and the solid dust particle, but is ignored because low gravity environments can only improve sealing capability compared to systems on Earth. The properties of regolith which are most relevant to dust sealing analysis are relative permeability, particle size distribution, and the roughness characterization of its shape. Size distribution and relative permeability are correlated, as older lunar rock sample locations have been impacted more, reducing the iron and leading to generally smaller grain sizes and higher magnetic susceptibility. Regolith dust has high ferromagnetic susceptibility for particles under 20 μm. The upper limit values for relative permeability are approximately 2, which is 1/4 to 1/3 that of ferrofluid. The magnetic pressure at the boundary of the fluid seal is calculated by taking the product of the permeability of free space, the intensity of magnetization, and the magnetic field strength. The pressure at the boundary is approximately $$2200 \frac{N}{m^2}.$$

This can be thought of as the restoring force at the surface of the seal and is a prominent method for determining the equilibrium shape of ferrofluid seals. Now the force exerted on the ferrofluid seal by the regolith due to magnetic attraction can be calculated. If this force is significantly less than the magnetic pressure on the surface of the seal, the regolith will not be able to deform the seal, let alone penetrate it. The magnetic pressure of the regolith particle is equal to the product of its relative permeability, the permeability of free space, the gradient of the magnetic field strength, the magnetic field strength, and the volume of the particle, all divided by the contacting area:

$$P_\mu = \frac{\mu_r \mu_0 \nabla H H V}{A} \quad (3)$$

A very small regolith particle of high magnetic susceptibility will exert a pressure of about $$600 \frac{N}{m^2}.$$

This is between 1/4 and 1/3 the restoring pressure of the ferrofluid seal, which is understood by the difference in magnetic permeabilities and provides a backdrop for the theoretical effectiveness of ferrofluid dust seals against regolith.

A simplified geometry was used for the pressure seal prototype. As opposed to embedding the seal system in a bearing, the prototype is developed as a standalone part with similar outer dimensions as the races. These similar dimensions allow both systems to be cycled in the same test chamber. Stainless steel pole pieces were manufactured in computer numerical control (CNC) machining and in the lathe by hand. The inner ring has two symmetrical teeth which complete the magnetic circuit. The outer ring is split into separate poles, with a ring of uncoated neodymium disc magnets stuck between the poles. Any protrusions from the magnetic ring are sanded flat, and then sealed with epoxy. The epoxy simultaneously prevents the magnets from shifting, seals leakage through the ring, and prevents oxidation and corrosion of the uncoated neodymium.

Figure 7:
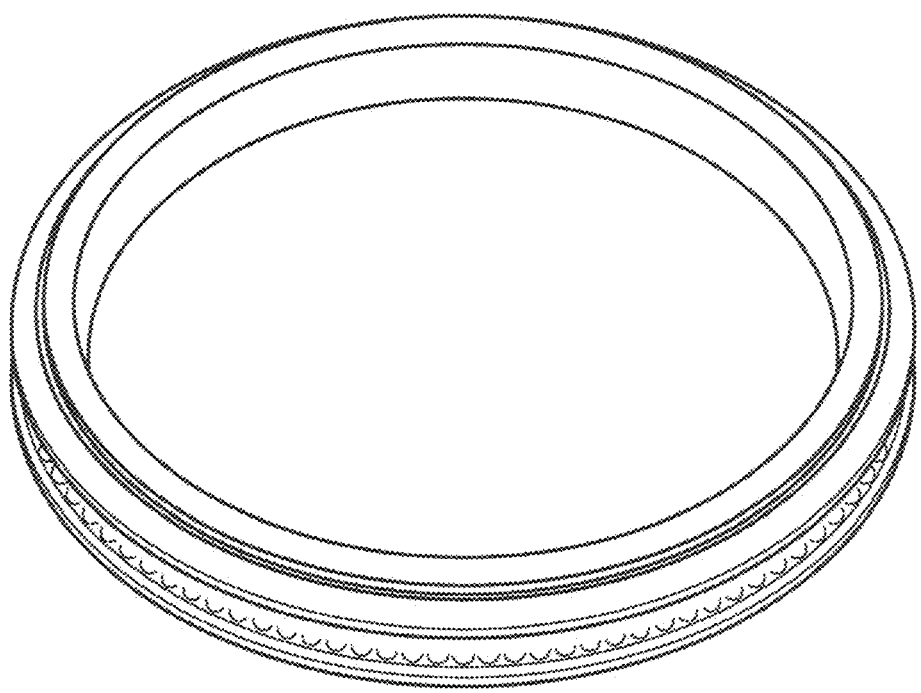
FIG. 7 depicts an isometric view of a ferrofluid seal prototype according to an embodiment of the present invention.
Figure 8:
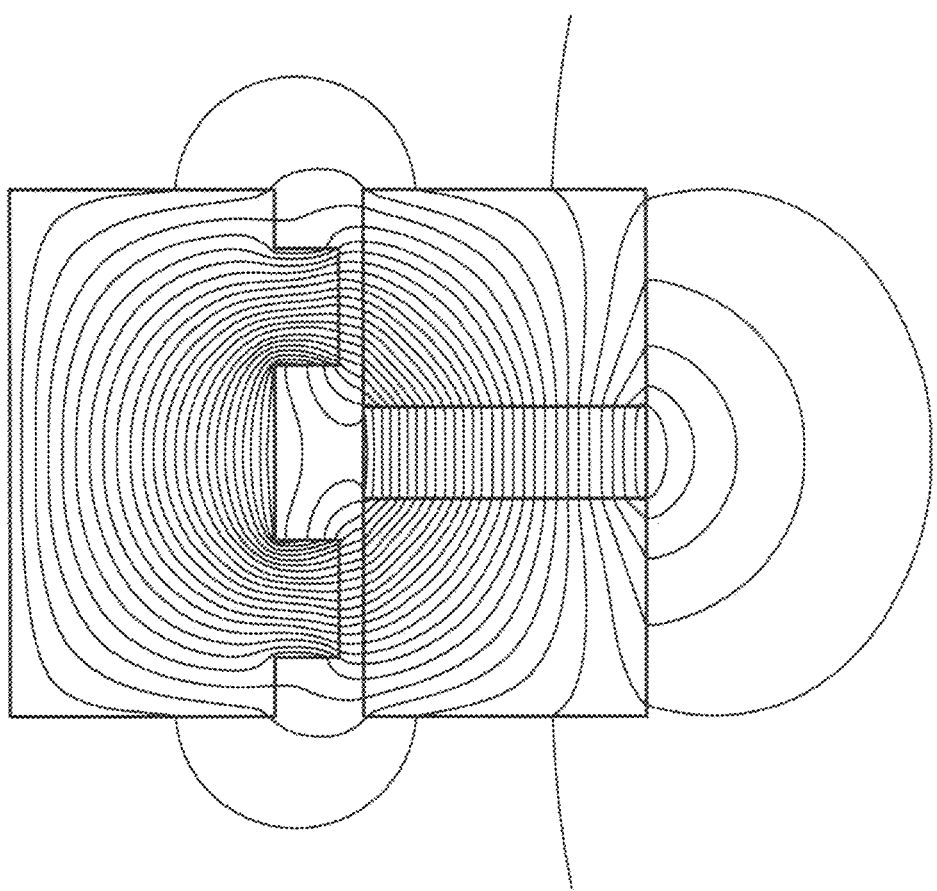
FIG. 8 depicts seal prototype vector potential lines according to an embodiment of the present invention.
Figure 9:
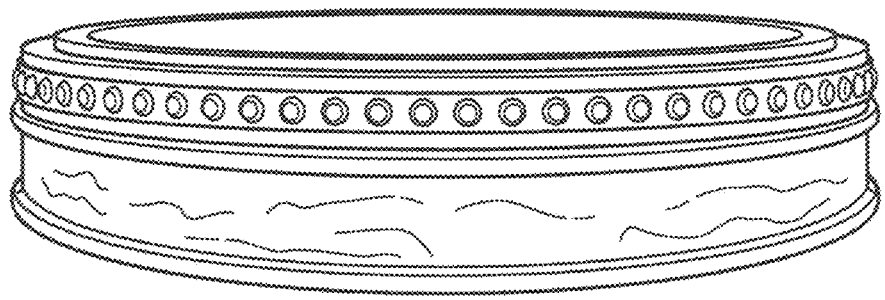
FIG. 9 depicts a side view of a ferrofluid seal prototype according to an embodiment of the present invention.
Figure 10:
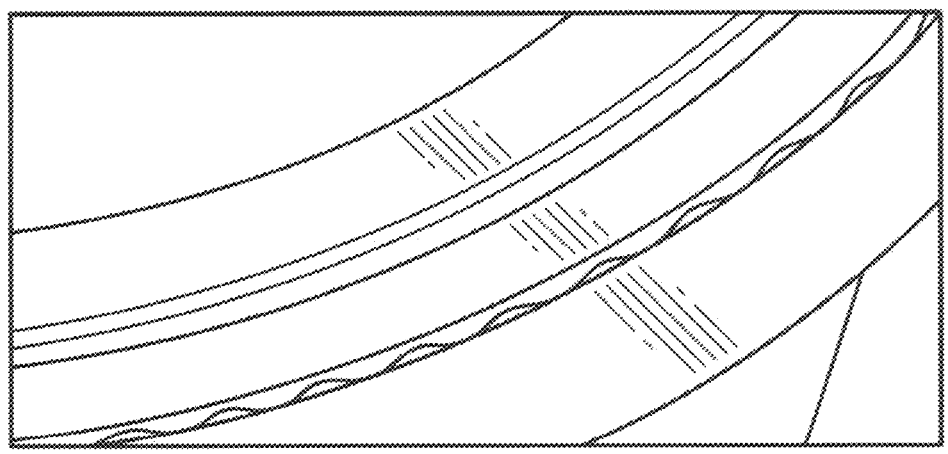
FIG. 10 depicts a ferrofluid seal prototype gap between tooth and outer race in which ferrofluid is held according to an embodiment of the present invention.

The seal assembly was then fixed to the race prototype with glue and the circumference was sealed with liquid sealant. Ferrofluid was deposited into the upper tooth and spread around the entire circumference of the ring. The ferrofluid is successfully held in place without leakage even when rotated, jostled, transported, and flipped upside down. The weight of the ferrofluid alone verifies the seal's ability to withstand at least 0.12 atm. FIG. 7 depicts an isometric view of the ferrofluid seal prototype. FIG. 8 depicts the seal prototype vector potential lines. FIG. 9 depicts a side view of the ferrofluid seal prototype. FIG. 10 depicts a gap between the tooth and outer race in which the ferrofluid is held in the prototype.

Test Chamber Configuration and Protocol

Figure 11A:
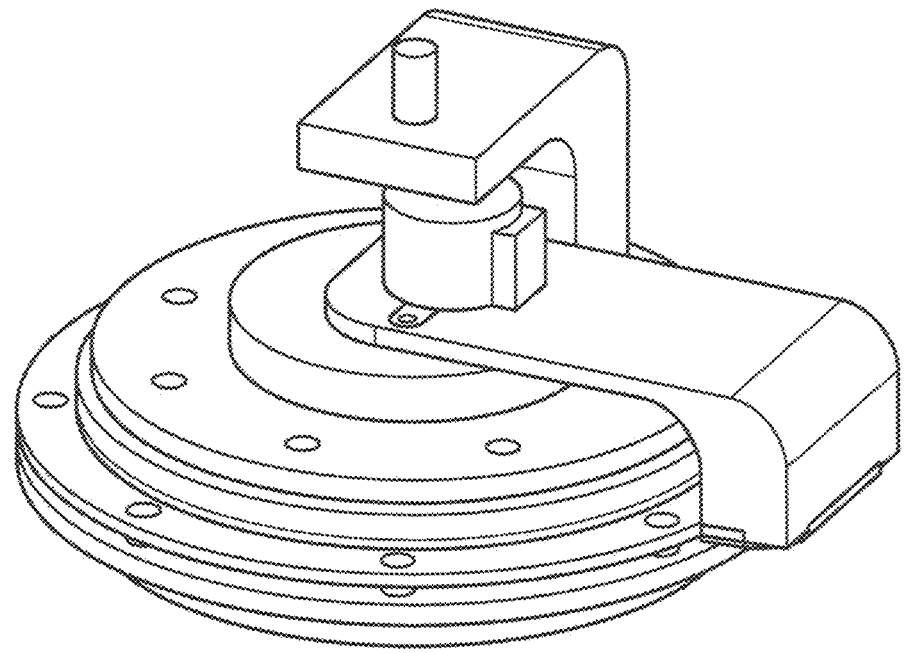
FIG. 11(a) depicts an isometric view of a testing chamber used for race testing according to an embodiment of the present invention.
Figure 11B:
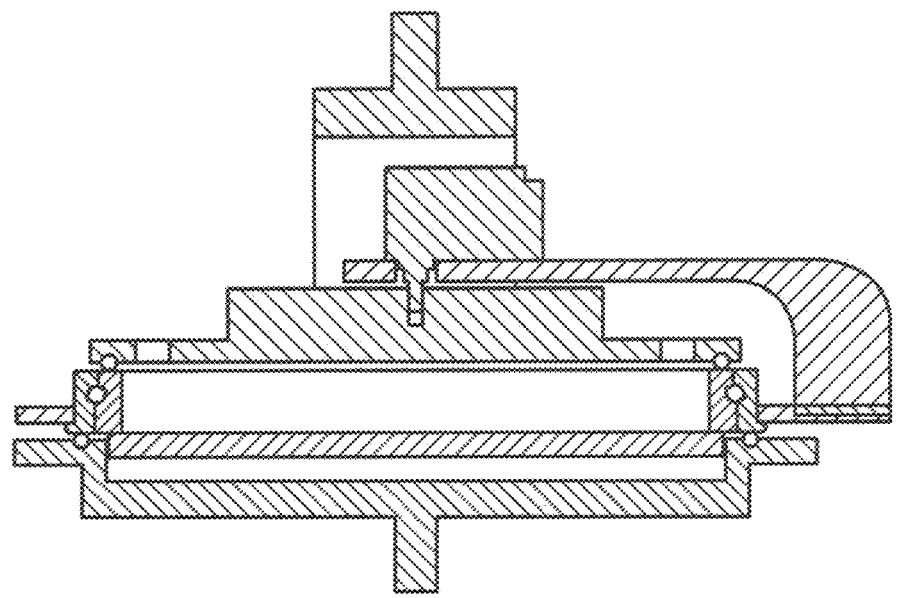
FIG. 11(b) depicts a cross-sectional view of a testing chamber used for race testing according to an embodiment of the present invention.
Figure 13A:
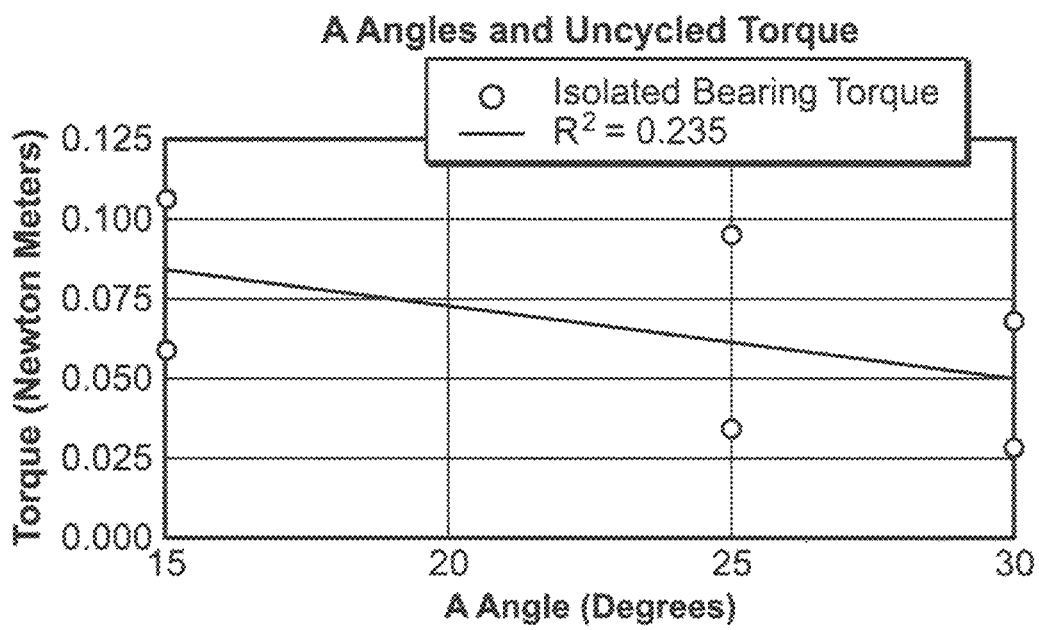
FIG. 13(a) depicts a graph of A angle measured against static, uncycled, and unloaded torque according to an embodiment of the present invention.
Figure 13B:
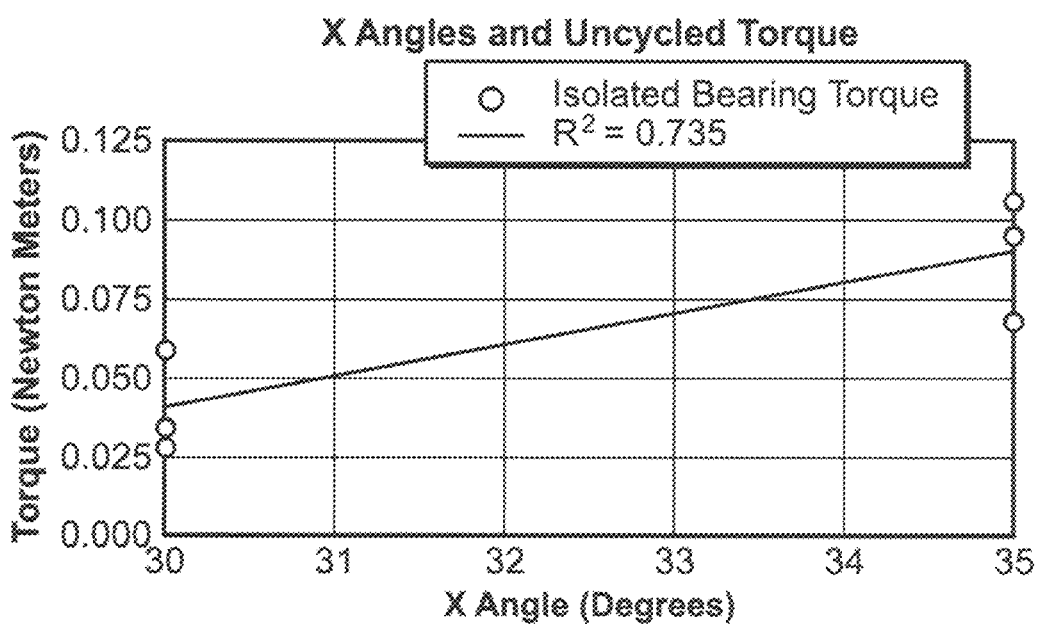
FIG. 13(b) depicts a graph of X angle measured against static, uncycled, and unloaded torque according to an embodiment of the present invention.
Figure 13C:
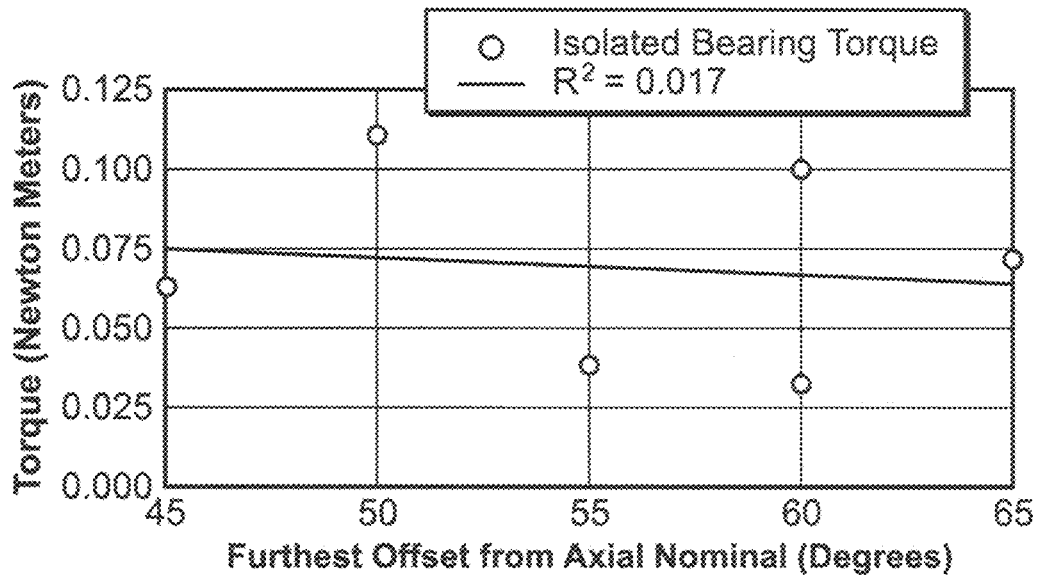
FIG. 13(c) depicts a graph of furthest contact point from bearing central axis normal measured against static, uncycled, and unloaded torque according to an embodiment of the present invention.
Figure 13D:
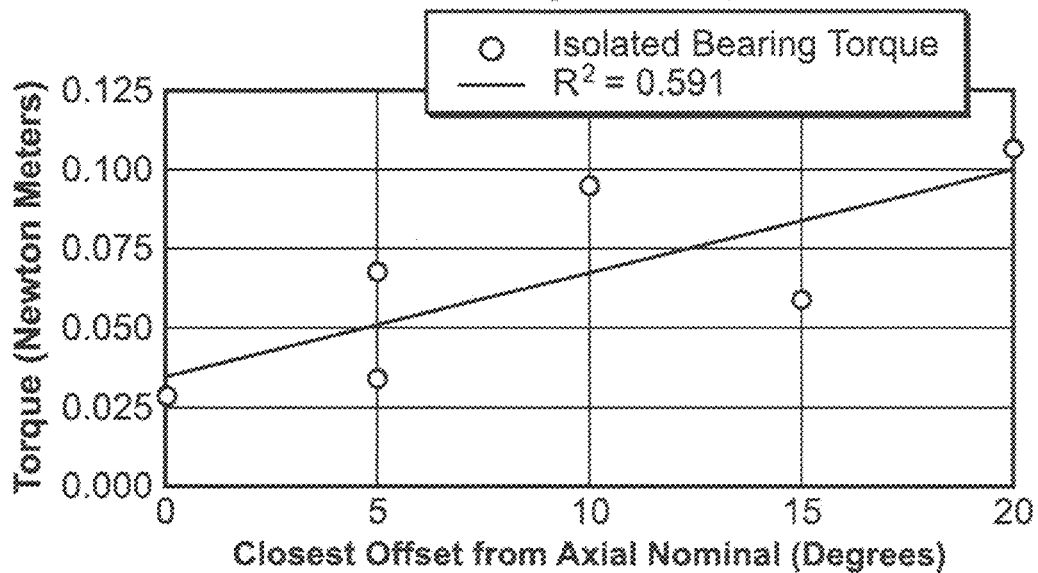
FIG. 13(d) depicts a graph of closest contact angle from bearing central axis normal measured against static, uncycled, and unloaded torque according to an embodiment of the present invention.

The bearings used to test race geometry do not have pressure sealing capabilities, and so to fully simulate a bearing oscillating due to the pressure differential, a passive axial force needs to be applied. This force is a tensile force, as in operation the inner race is fixed to a fabric sleeve that is blown outwards relative to the outer ring. To accomplish this, an oscillating test chamber is used in conjunction with a materials testing machine such as Instron. FIGS. 11(*a*)-(*b*) depict isometric and cross-sectional views of the testing chamber used for race testing in Instron. Oscillation is much more similar to the environment that these bearings will experience as opposed to pure rotation that is really limited by human physiology. This allows for determination of bearing static torque entirely dependent on the isolated race geometry. The plate on top of the inner ring and attached to the bottom of the inner race via another plate has a tensile force applied to it, while a plate on the bottom of the outer race and attached to the top of the outer race via another plate is secured to the bottom of the Instron. The inner race is rotated by a motor attached to the top plate around the outer race and interfaced with the plate on the top of the inner race, ensuring that rotation of the races occurs relative to one another. Limit switches are used to determine the end positions of clockwise and counterclockwise rotations, which in the event of slippage is more reliable than hard-coding the rotation. The operating pressure of an example EVA spacesuit is configured to be approximately 1/3 atm, or 34.5 kPa. Assuming there is no external pressure when the spacesuit is in operation results in a pressure differential of 34.5 kPa. Multiplying pressure differential by the surface area of the bottom plate, which the pressure differential is assumed to be acting upon, yields a tensile force of approximately 0.622 kN. This is the value of tensile force constantly applied by the Instron during testing.

Before testing, a custom machined pulley equipped with a digital force gauge determines the torque required to begin rotation of the bearing. Afterwards, torque measurements are taken after every set of 2,000 cycles. There are 10,000 total cycles of 180 degree rotations clockwise and counterclockwise, meaning there are six points at which the torque, and thus internal friction of the races can be evaluated. This pulley screws into the plate on top of the inner race, allowing for ease of transition between oscillations and torque testing. Torques are additive, so the torque required to rotate the bearing alone can be determined by subtracting the torque required to rotate the pulley and the torque required to rotate the test chamber from the total torque required to begin rotation of the entire system to yield torque to rotate the bearing alone. Additionally, at the end of each bearing's life cycle, the surface roughness of each contact point can be evaluated after disassembly.

Furthermore, the race testing chamber serves two functions, the other being an evaluation of the ferrofluidic pressure seal prototype. The bottom plate for the outer ring is replaced with a nearly identical plate that has a pressure gauge and a one-way valve, allowing for pressurization of the prototype. This allows for validation of the ferromagnetic pressure seal as an isolated system and with respect to computer models of pressure differentials. Information and validation of this stage is critical before integrating a ferrofluidic pressure seal into a bearing, as differences between magnetic modeling software in conjunction with theory may need to be accounted for.

Test Results

The disclosed results come from a functional prototype of the ferrofluid seal and static torque testing of the race geometry. The AX-5 space suit was a prototype hard-shell space suit with no softgoods elements, it used the Kaydon KA045KP0 for its wrist bearing, which has an inner diameter of 114.3 mm. All test bearings having an inner diameter of 117 mm. Using interpolation from Kaydon's catalog 300, the KA045KP0 has an unloaded, uncycled static torque of 0.0230 Nm, while the best performing bearing has a static, unloaded torque of 0.0287 Nm. None of the bearings use lubricant, feature a ball separator ring, or have an industrial assembly lacking a ball loading hole plug. These factors could explain the difference in performance. Furthermore, an example HPEG Glove configured to improve on the EMU Phase VI glove, which has similar dimension to the test bearings, is required to have no more than 0.565 Nm dynamic torque when in a dusty environment and pressurized to 4.3 psid. While the precise environment of dust testing is not met by the testing conditions, the testing conditions were not dissimilar, with plenty of dust and metal shavings, which may have an even more adverse effect on the bearings than normal regolith particles and human contaminants like hair and skin that typically impair the bearings. Additionally, while the A30X30 was not loaded to mimic the pressure load, the fact that the running torque requirement is about 20 times higher than the static torque is a good sign. A table of all test bearing static torques is shown in FIG. 12.

Analysis of the race profiles against one another reveals certain parameters that affect the performance which are to be kept in mind when configuring profiles. Furthest contact angle from bearing central axis normal and A angle do not appear to have a pronounced effect on static torque. The $R^2$ values of these variables are 0.017 and 0.235, respectively. Instead, closest contact angle from bearing central axis normal and X angle do appear to have a distinct effect. Having an X contact angle of 30° results in dramatically improved performance. Having the closest contact angle as near as possible to bearing central axis normal also results in a decreased required torque. The $R^2$ values associated with X angle and closest contact angle are 0.735 and 0.591, respectively. In line with this, the best performing bearing was the A30X30 with a static, unloaded torque of 0.0287 Nm. From top right counterclockwise, FIGS. 13(a)-(d) depict graphs of X angle, A angle, furthest contact point from bearing central axis normal, and closest contact angle from bearing central axis normal measured against static, uncycled, and unloaded torque.

Example Shoulder Bearing

An example integrable shoulder bearing was configured for demonstration purposes. In addition to a ferrofluid pressure seal, it also features a Nomex dust seal on the space suit internal side. It uses the A30X30 race profile with four angled contact points. The total pressure capacity of the bearing is approximately 0.8 atm, with each tooth having a pressure differential of 0.2 atm. The bearing is made from aluminum, while the ball and teeth completing the magnetic circuit are made of stainless steel. The magnet driving the circuit is made from neodymium. It has important features for integration, like thread holes and cord attachments and necessary gaskets installed.

Figure 14:
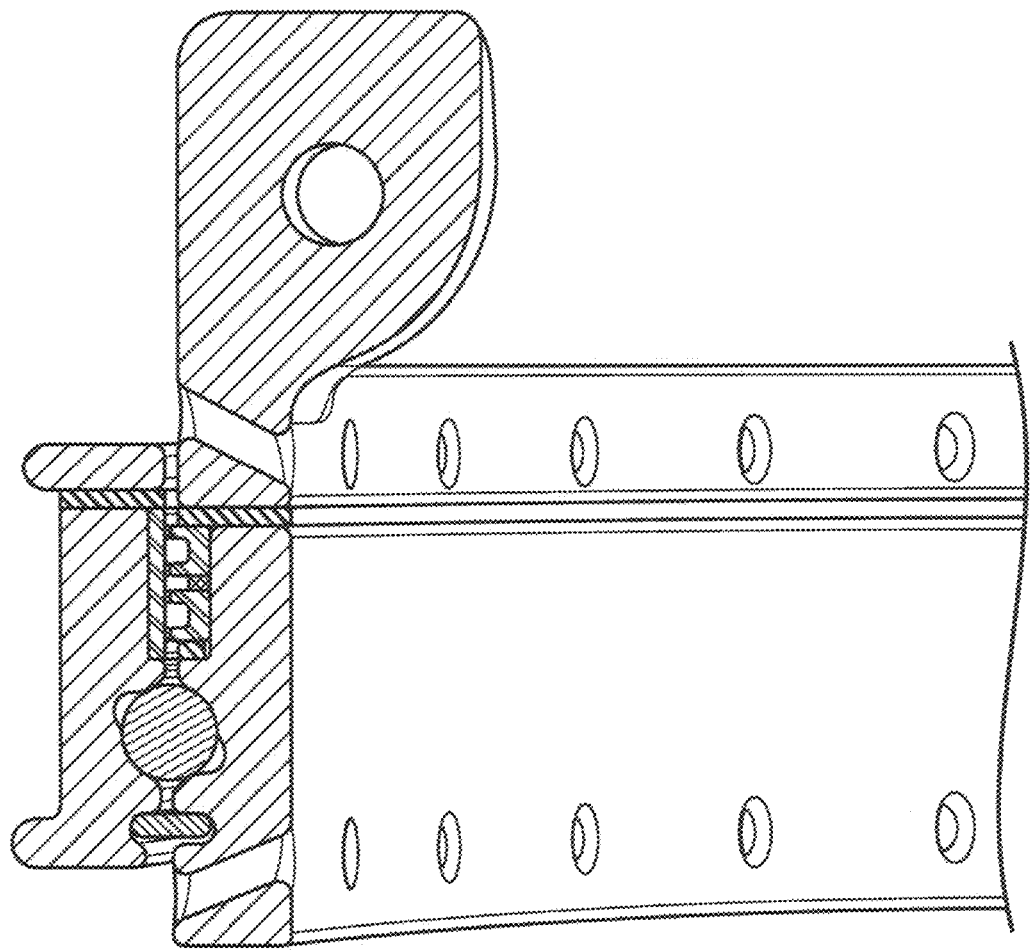
FIG. 14 depicts an integration ready shoulder bearing cross section according to an embodiment of the present invention.
Figure 15:
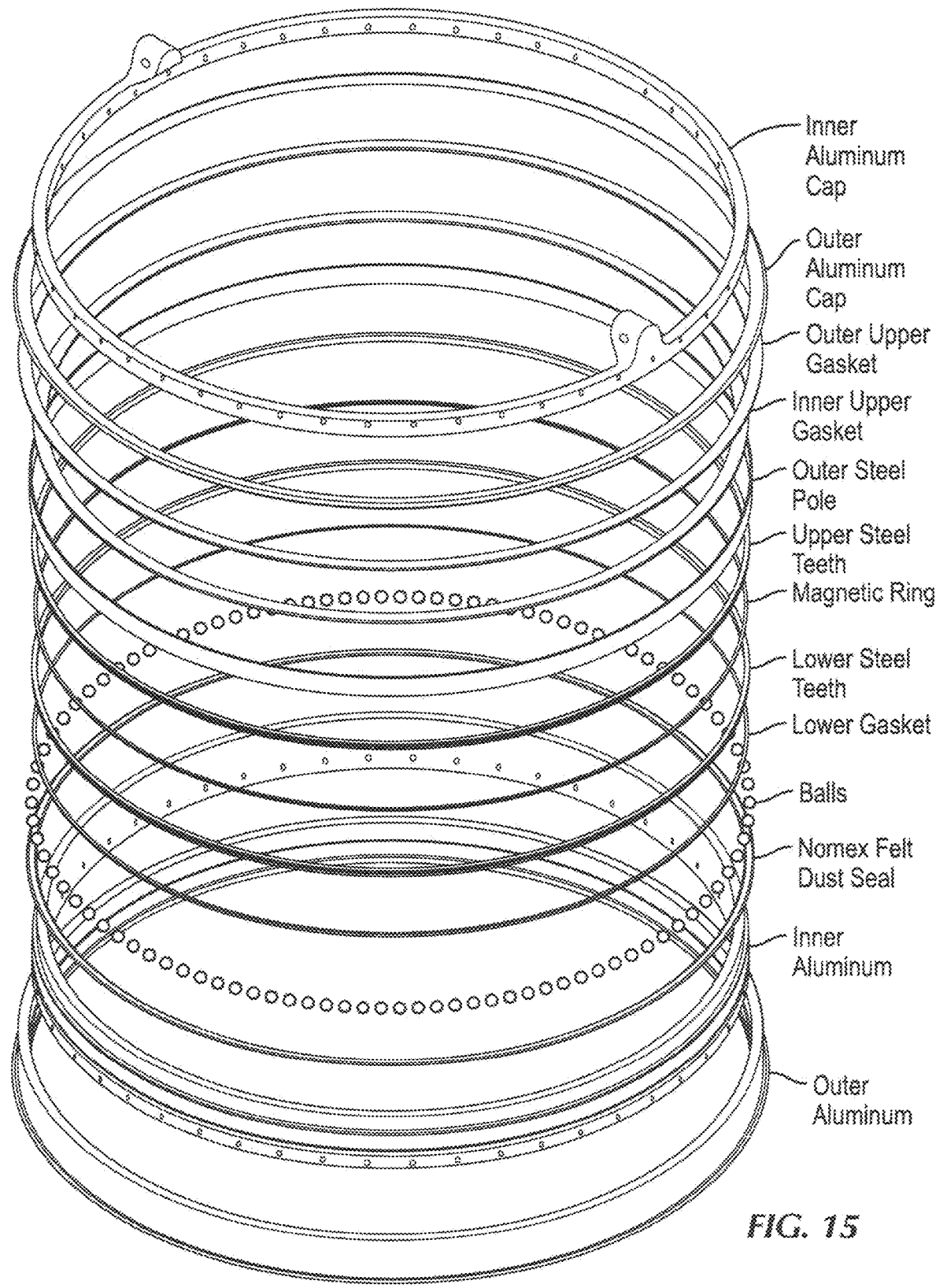
FIG. 15 depicts an exploded view of a shoulder bearing model according to an embodiment of the present invention.

The shoulder bearing features a multipart assembly with two aluminum part inner and outer races that are secured to caps with screws and separated by rubber gaskets. This allows for the steel ferrofluid pressure seal to be inserted into the inner and outer race. Spacer balls are used in lieu of a separator ring. Load carrying balls are 4 mm in diameter and are made of stainless steel as well. The Nomex dust seal on the bottom of the races can be inserted manually after race assembly. This bearing has a mass of only 446 g. FIG. 14 depicts a cross-section of the integration ready shoulder bearing and FIG. 15 depicts an exploded view of the shoulder bearing, with element functions identical to that of FIG. 5.

Conclusion:

As such, generally disclosed herein are embodiments for improvements related to reducing friction and race wear in spacesuit bearings without necessitating the use of flammable materials. Using angled and four contact point races, which are viable geometries, race wear can be reduced and better responses to radial and axial loading obtained. Furthermore, using ferrofluid pressure seals, pressure seal friction can be eliminated entirely and has the potential to integrate pressure and dust seals, eliminating a bearing subsystem and further reducing friction. While these effects may not be burdensome in smaller diameter bearings, these configurations have the potential to significantly increase the performance of waist, hip, and shoulder bearings.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A space suit joint comprising:
    a ferrofluid pressure seal comprising an inner and outer race with a magnetic circuit embedded therein, the outer race having an axial centerline; and
    a contact bearing having a plurality of balls between the inner race and outer race, each ball of the plurality of balls separated from another ball by a spacer ball, the contact bearing having a radial centerline extending perpendicular from the axial centerline through a center point of a ball of the plurality of balls positioned between the inner and outer race, the contact bearing having:
        a plurality of contact points, including at least a first contact point and a second contact point on each of the inner race and outer race;
        for each of the inner race and outer race, a first angle formed between a first line extending from the center point to the first contact point and a second line extending from the center point to the second contact point;
        a first offset angle formed between a radial centerline and a line bisecting the first angle; and
        a second offset angle formed between the line bisecting the first angle and the first line or the second line.

2. The space suit joint of claim 1, wherein the plurality of contact points comprises four contact points.

3. The space suit joint of claim 1, wherein the first offset angle is between 15 to 40 degrees.

4. The space suit joint of claim 1, wherein the second offset angle is between 30 to 45 degrees.

5. The space suit joint of claim 1, wherein the first offset angle is 30 degrees and the second offset angle is 30 degrees.

6. The space suit joint of claim 1, wherein the contact bearing comprises a single row of balls, the ball positioned between the inner and outer race being one of the single row of balls.

7. The space suit joint of claim 1, wherein the magnetic circuit is made of neodymium and magnetic stainless steel.

8. The space suit joint of claim 1, wherein the magnetic circuit comprises:
   a first portion comprising a ring of permanent magnets connected to magnetic poles; and
   a second portion comprising a magnetic base, the second portion being separated from the first portion.

9. The space suit joint of claim 1, wherein the magnetic circuit generates a localized magnetic field to hold the ferrofluid in a ring shape.

10. The space suit joint of claim 1, wherein the ferrofluid pressure seal further comprises a plurality of protruding teeth.

11. A space suit joint comprising:
   a contact bearing having a-plurality of balls between the inner race and outer race, each ball of the plurality of balls separated from another ball by a spacer ball, the contact bearing having a radial centerline extending perpendicular from an axial centerline of the contact bearing through a center point of a ball positioned between an inner and outer race of the contact bearing, the contact bearing having:
      a plurality of contact points, including at least a first contact point and a second contact point on each of the inner race and outer race;
      for each of the inner race and outer race, a first angle formed between a first line extending from the center point to the first contact point and a second line extending from the center point to the second contact point;
      a first offset angle formed between a radial centerline and a line bisecting the first angle; and
      a second offset angle formed between the line bisecting the first angle and the first line or the second line.

12. The space suit joint of claim 11, wherein the plurality of contact points comprises four contact points.

13. The space suit joint of claim 11, wherein the first offset angle is between 15 to 40 degrees.

14. The space suit joint of claim 11, wherein the second offset angle is between 30 to 45 degrees.

15. The space suit joint of claim 11, wherein the first offset angle is 30 degrees and the second offset angle is 30 degrees.

16. The space suit joint of claim 11, wherein the contact bearing further comprises at least one ball.

* * * * *